(12) United States Patent
Corrado

(10) Patent No.: US 6,817,111 B1
(45) Date of Patent: Nov. 16, 2004

(54) ALIGNMENT TOOL FOR POSITIONING A CUTTING TOOL OF A SHAPING MACHINE

(76) Inventor: James M. Corrado, 8004 Matterhorn Ct., Potomac, MD (US) 20854

(*) Notice: Subject to any disclaimer, the term of this patent is extended or adjusted under 35 U.S.C. 154(b) by 0 days.

(21) Appl. No.: 10/673,175

(22) Filed: Sep. 30, 2003

(51) Int. Cl.$^7$ .................................................. B23B 49/00
(52) U.S. Cl. ................................................ 33/632; 33/628
(58) Field of Search .......................... 33/613, 628, 630, 33/632, 638, 639, 642, 645

(56) References Cited

U.S. PATENT DOCUMENTS

| | | | |
|---|---|---|---|
| 948,523 A | 2/1910 | Perkins | |
| 1,283,868 A | 11/1918 | Nefedov | |
| 2,667,703 A | 2/1954 | Zumkeller | |
| 2,777,210 A | 1/1957 | Johnson et al. | |
| 2,955,359 A | 10/1960 | Carpenter | |
| 3,021,604 A * | 2/1962 | Moore | 33/639 |
| 3,238,630 A | 3/1966 | Jeanneret | |
| 3,358,375 A | 12/1967 | Lutz | |
| 3,575,072 A | 4/1971 | Silver et al. | |
| 3,600,815 A | 8/1971 | Link | |
| 3,728,796 A | 4/1973 | Lobaugh | |
| 3,789,509 A | 2/1974 | Harkness | |
| 3,826,011 A * | 7/1974 | D'Aniello | 33/642 |
| 4,018,113 A | 4/1977 | Blazenin et al. | |
| 4,470,198 A | 9/1984 | Schering | |
| 4,488,360 A | 12/1984 | Steighner | |
| 4,868,994 A | 9/1989 | Pirce | |
| D304,200 S | 10/1989 | MacKelvie | |
| 4,879,817 A | 11/1989 | McMurtry | |
| 4,926,337 A | 5/1990 | Gile | |
| 4,964,224 A * | 10/1990 | Jackson | 33/645 |
| 5,036,595 A * | 8/1991 | Nevery | 33/642 |
| 5,272,818 A | 12/1993 | Youden et al. | |
| 5,465,492 A * | 11/1995 | Bond | 33/638 |
| 2004/0128849 A1 * | 7/2004 | Navarro et al. | 33/638 |

* cited by examiner

Primary Examiner—G. Bradley Bennett
(74) Attorney, Agent, or Firm—Rosenberg, Klein & Lee

(57) ABSTRACT

An alignment tool for positioning the tip of a cutting tool of a spindle-driven shaping machine is provided with means for accurately and repeatedly locating a cutting tool plane of motion of any angle with respect to the shaping machine's orientation is space, means for positioning the center of gravity of the alignment tool to a desired location and means for indicating a plurality of parallel cutting planes in which the cutting tool may be located. The alignment tool affords more accurate placement of the shaping machine cutter with greater ease of use than similar tools of the prior art.

21 Claims, 10 Drawing Sheets

ALIGNMENT TOOL FOR POSITIONING A CUTTING TOOL OF A SHAPING MACHINE

FIELD OF THE INVENTION

The present invention relates to cutting tool placement devices for spindle-driven shaping machines. More particularly, the present invention relates to alignment tools and gauges for accurately and repeatably locating a cutting tool plane of motion and for placing the tip of a cutting tool in a desired plane parallel thereto.

BACKGROUND OF THE INVENTION

In many applications involving spindle-driven shaping machines, such as a lathe, it is often desirable to place the tip of a cutting tool accurately in a cutting plane passing transversely through the axis of rotation of the spindle. This is especially apparent during facing operations where a misplaced shaping machine cutter may leave a raised nub at the center of the workpiece. Numerous tools have been developed for positioning the tip of the cutting tool to the appropriate location on the workpiece.

One legacy tool setting gauge is disclosed in U.S. Pat. No. 2,777,210 to Johnson, et al., which is used to position the cutter of a machine tool on a plane which intersects the axis of rotation of a workpiece. The tool setting gauge of Johnson includes a V-shaped clamping device, a tool positioning surface parallel to a base surface, and a rotatable spirit level vial holder. The tool is aligned to the tool bed, i.e., cutting tool axis of a particular machine by placing the base surface against the tool slide of the machine tool and rotating the spirit level vial holder until the bubble therein is centered. The vial holder is then clamped in place by means of a backing screw. Once the clamp has been tightened, the tool gauge is then affixed to a workpiece via the clamping device and the tip of the cutting tool is adjusted until it just comes flush with the tool positioning surface. The tip of the cutting tool is then located in a cutting plane which includes the axis of rotation of the workpiece.

The tool setting gauge of Johnson suffers several shortcomings rendering its effective use on modern shaping machines limited. First, with only the manual rotation of the spirit level vial holder as means for locating the tool positioning surface in the proper orientation, the tool setting gauge of Johnson is grossly inaccurate and minimizes the accuracy of modem machine tools. Further, the tool setting gauge of Johnson is constructed such that essentially the entire weight of the tool is located on one side of the workpiece, making it difficult to established maintain a desired orientation of the gauge (i.e., bubble in spirit level centered) while simultaneously attempting to locate the tip of the cutting tool flush with the tool positioning surface. A still further shortcoming is that the gauge of Johnson may only be used to position a cutting tool on a plane that includes the axis of rotation of the workpiece, which may not be the optimum cutting plane in certain applications.

SUMMARY OF THE INVENTION

The alignment tool of the present invention overcomes the shortcomings of Johnson and similar gauges of the prior art by providing accurate cutting axis locator means, adjustable weight distribution, and cutting plane indication means to indicate a plurality of parallel cutting planes, each located at varying distance from the cutting plane that includes the axis of rotation of the workpiece.

One object of the present invention is to provide an alignment tool for setting the tip of a cutting tool at a desired location on a workpiece in a spindle-driven shaping machine with cutting axis locator means that accurately and repeatably locates a cutting plane of any angle independently from the orientation in space of the shaping machine.

Another object of the present invention is to provide an alignment tool with adjustable weight distribution means for positioning the center of gravity of the alignment tool at a desired location during cutting tool placement procedures.

A still further object of the present invention is to provide an alignment tool with a plurality of cutting plane indicators, each parallel to the longitudinal center line of the alignment tool and located at varying distances from the cutting plane that includes the axis of rotation of the workpiece.

These and other objects of the present invention are realized by an alignment tool which includes an arbor clamp for positioning the longitudinal center line of the alignment tool on the axis of rotation of the spindle of the shaping machine; a displaceable counterweight for positioning a longitudinal center of gravity of the alignment tool; an indicator surface parallel with the longitudinal center line of the alignment tool; a plurality of cutting plane indicators for indicating a point on a corresponding cutting plane; and cutting axis locator means for aligning the longitudinal center line of the alignment tool to the cutting tool axis of the shaping machine.

In one embodiment of the present invention, the cutting plane indicators include a protruding anvil to be placed against the tip of the shaping machine cutter.

In another embodiment of the present invention, each cutting plane indicator is a laser spot emitted from a laser coupled to the alignment tool body.

In another embodiment of the present invention, the cutting axis locator means includes coarse and fine indicator means.

In yet another embodiment of the present invention, the coarse and fine indicator means of the cutting axis locator means are spirit level vials.

In still another embodiment of the present invention, the cutting axis locator means includes coarse and fine adjustment means.

In yet another embodiment of the present invention, the cutting axis locator means is an electronic level.

BRIEF DESCRIPTION OF THE DRAWINGS

The objects defined above, as well as further advantages of the present invention, are best understood by referring to the following Detailed Description in conjunction with the accompanying Drawings, in which.

DETAILED DESCRIPTION OF THE PREFERRED EMBODIMENTS

Figure 1:
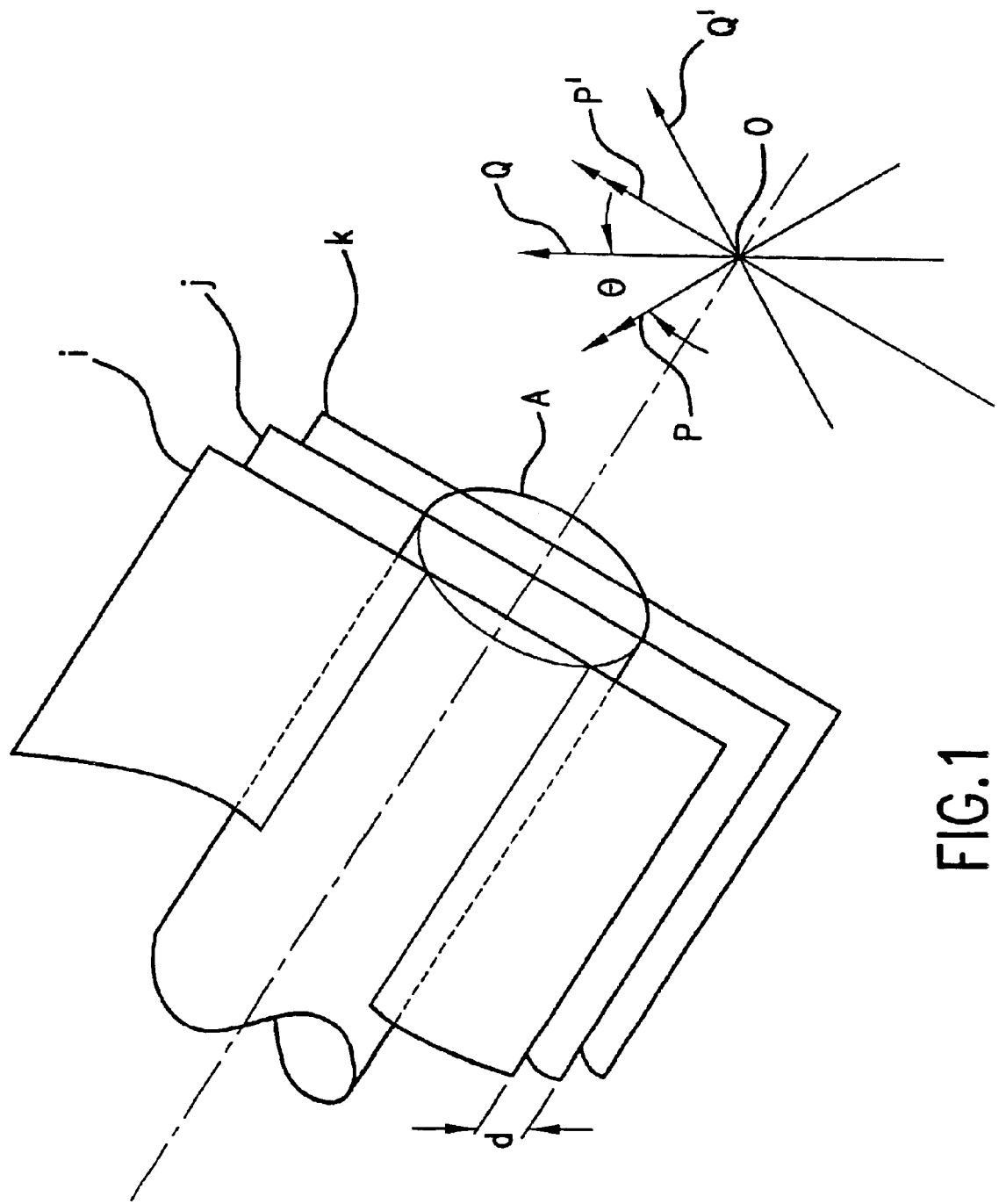
FIG. 1 is a diagram of the geometry of spindle-driven shaping machine applications.

Prior to discussing the details of construction of the present alignment tool, it is believed beneficial to first briefly describe the applicable geometry of shaping machine cutting operations in which the alignment tool is to be used. The shaping machine geometry is graphically illustrated in FIG. 1. Modern shaping machines, such as CNC lathes, operate along more than one set of orthogonal axes, two of which are shown in FIG. 1. The first set of axes, indicated at Q, Q' are arbitrary shaping machine axes representing a particular shaping machine's orientation in space. A second set of axes, indicated at P, P' represent the axes on which the cutting tool of the shaping machine moves during cutting operations. As is shown in the Figure, cutting tool axes P, P' are rotated by an angle θ with respect to the shaping machine axes Q, Q'. This geometry is typical of modern slant bed shaping machinery where the direction of motion of the cutting device is not parallel to the resting position of the cutting machine itself.

Parallel to the longitudinal cutting tool axis, i.e., the axis parallel to the tool bed, are a plurality of cutting planes i, j, k separated by a distance d. Each cutting plane i, j, k represents the range of motion of the cutting tool once the cutting tool has been set to a specific point on the surface of workpiece A that is a predetermined distance from the center point O of workpiece A. As previously stated, it is an object of the alignment tool of the present invention to set the cutter of the shaping machine on a plane that includes the center, or is a predetermined distance from the center, of the workpiece A.

Figure 2A:
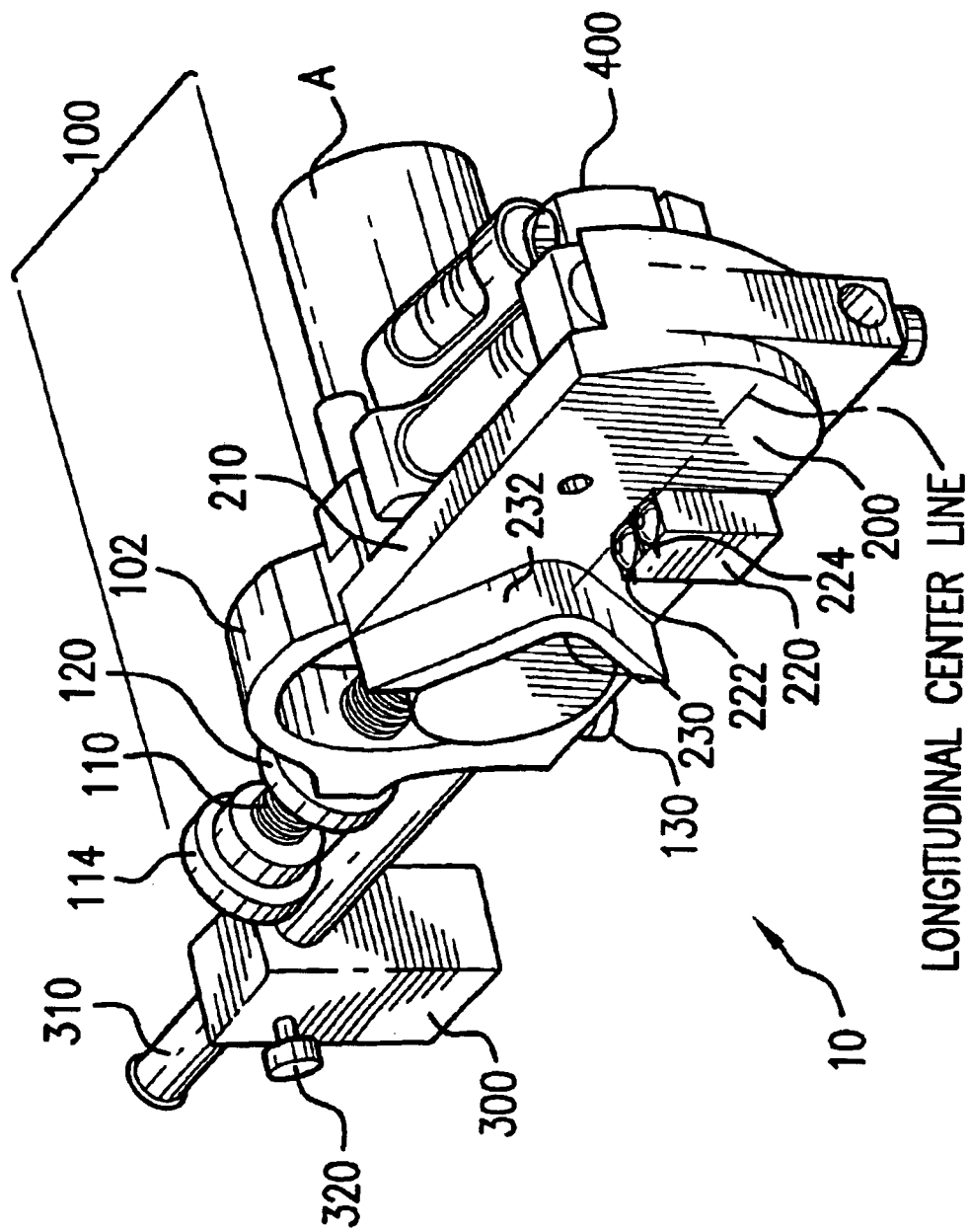
FIGS. 2A, 2B, 2C are illustrations indicating the various components of the alignment tool of the present invention.
Figure 2B:
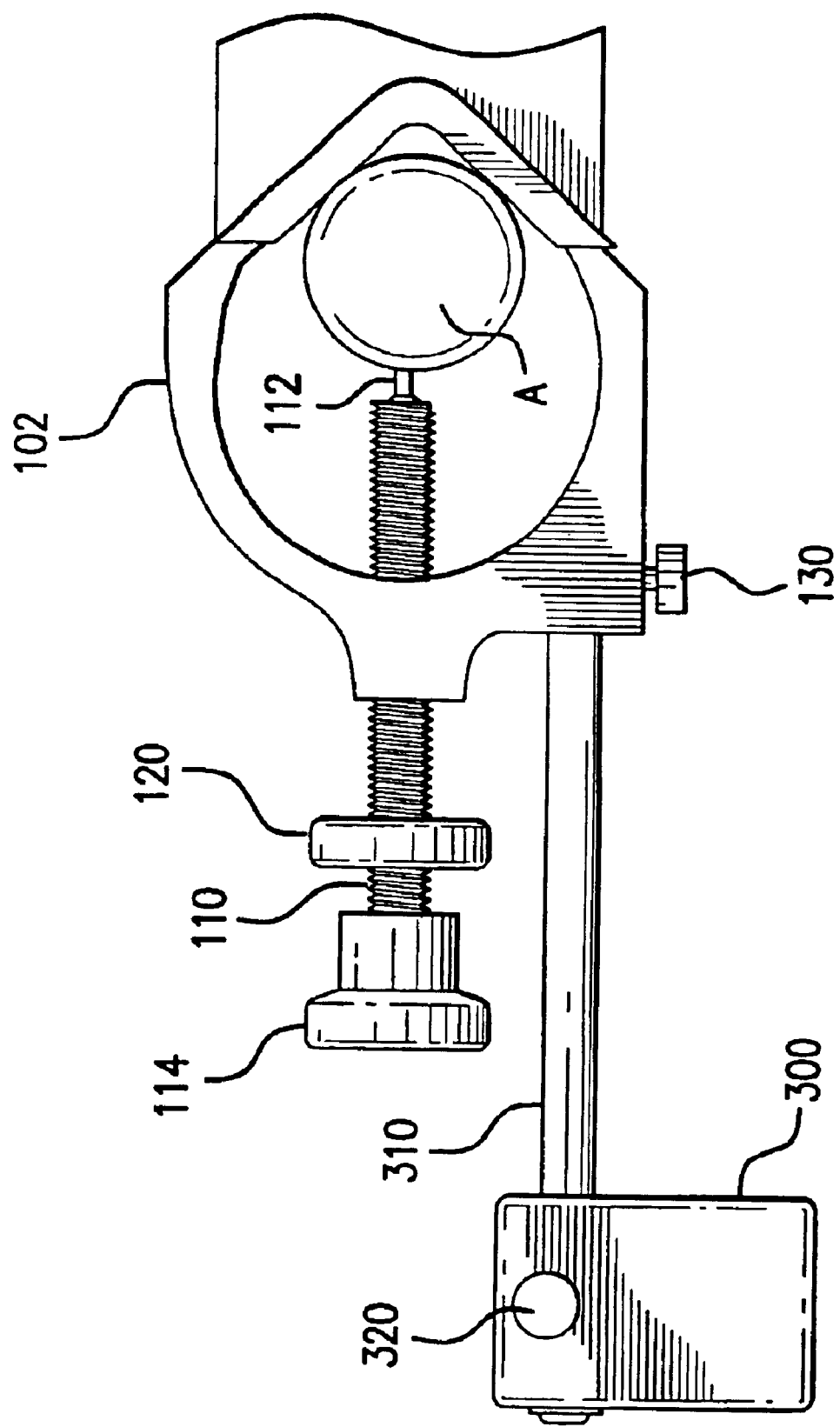
Figure 2C:
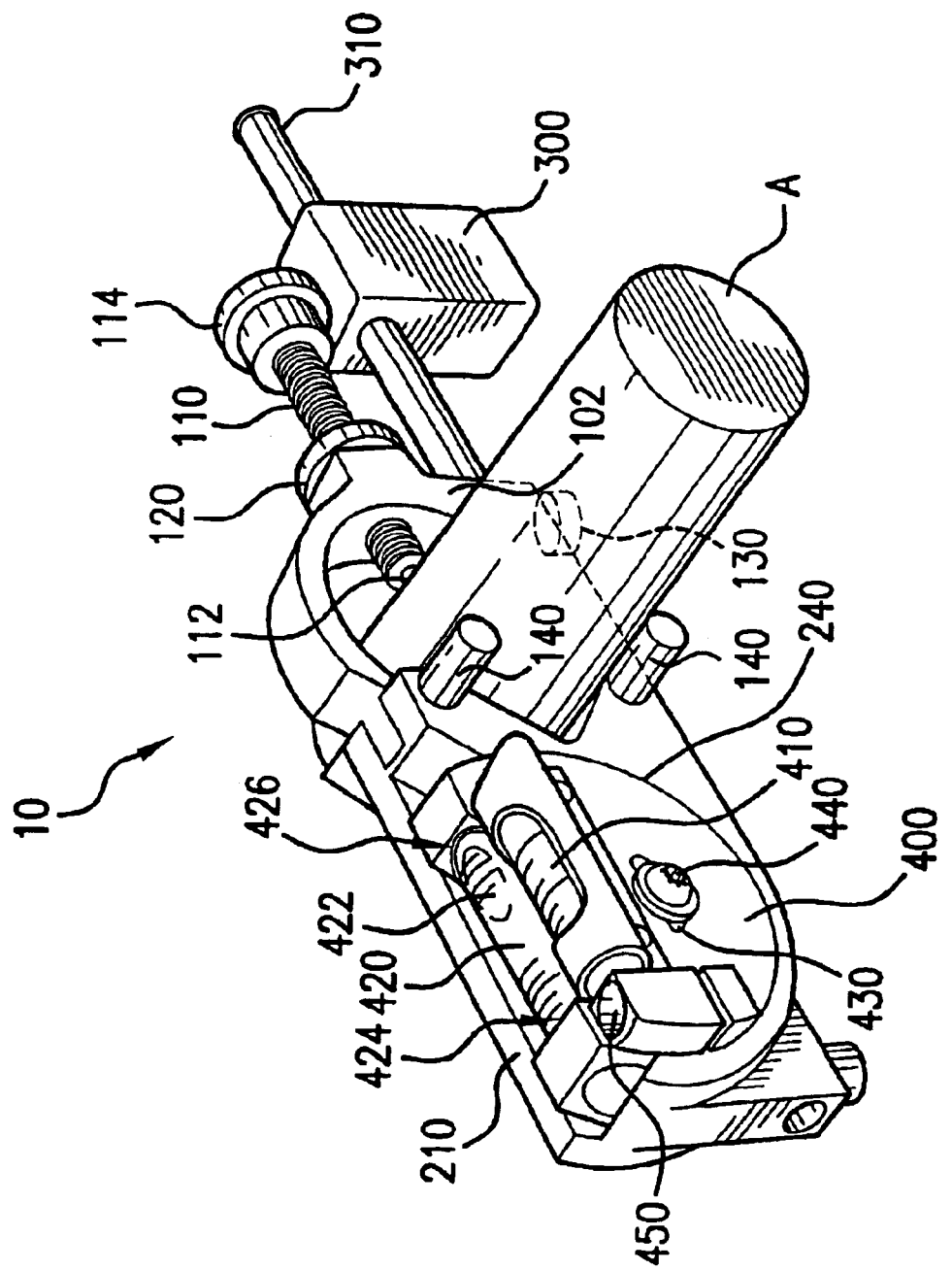

A preferred embodiment of the alignment tool of the present invention is illustrated in FIGS. 2A, 2B, and 2C. As is shown in the Figures, the alignment tool 10 comprises four sub-assemblies: an arbor clamp 100 for providing a fastening means of the alignment tool 10 to a cylindrical arbor or workpiece A; an alignment tool body 200 including cutting plane indicators 222, 224 for locating a cutting plane on which a cutter of the shaping machine is to be located; a displaceable counterweight 300 for positioning a longitudinal center of gravity to assist in balancing alignment tool 10; and cutting axis locator means 400 for providing a reference in positioning the alignment tool body in the preferred cutting axis. The construction and function of each of the sub-assemblies will be discussed in detail in the following paragraphs.

Alignment tool body 200 has formed at one end thereof a V-shaped yoke 230, the inwardly directed apex of which defines the location of a longitudinal center line of the alignment tool. The V-shaped yoke is formed to capture a cylindrical workpiece A such that the axis of rotation of the cylindrical workpiece A lies on the longitudinal center line of the alignment tool 10. The lateral extent of V-shaped yoke 230 is increased by V-shaped flange 232 for adding more contact area between V-shaped yoke 230 and the cylindrical workpiece A. This added contact area prevents the alignment tool 10 from side-to-side rotation of the alignment tool on workpiece A, thereby facilitating more accurate placement of the shaping machine cutter.

An upper edge of alignment tool body 200 defines a longitudinally extending indicator surface 210, which is disposed thereon in parallelism with the longitudinal center line of the alignment tool 10. The amount of parallelism between indicating surface 210 and the longitudinal center line of the alignment tool 10 should be held to strict tolerance levels, as the indicating surface 210 is used in the initial alignment tool calibration procedures. The calibration procedures for the alignment tool 10 will be discussed in paragraphs that follow.

Figure 3:
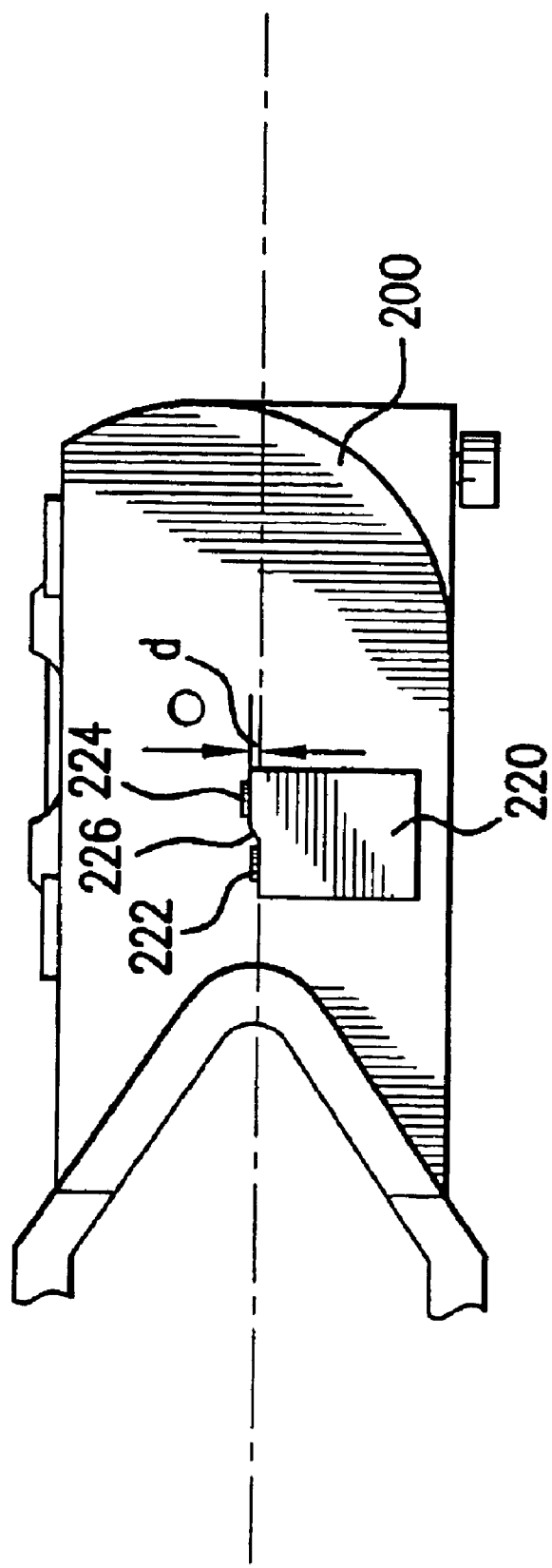
FIG. 3 is a side view illustration of one embodiment of the cutting plane indicators of the present invention.

On a lateral face of alignment tool body 200 are located a plurality of cutting plane indicators 222, 224. The plurality of cutting tool indicators 222, 224 are disposed in parallelism with the center line of alignment tool 10, each being spaced a predetermined distance therefrom. An exemplary configuration is illustrated in FIG. 3, which demonstrates the use of two cutting plane indicators 222, 224 disposed along the upper surface of mounting block 220. In a preferred embodiment, mounting block 220 is integrally constructed in one-piece formation with alignment tool body 200 and the upper portion thereof has defined thereon a stepped mounting surface 226 having step height d. Cutting plane indicators 222 and 224 are located such that cutting plane indicator 222 indicates a cutting plane co-located with the center line of the alignment tool 10 and cutting plane indicator 224 locates an off-center cutting plane, the cutting plane being off-center by the distance d. Whereas only two cutting plane indicators are illustrated in FIG. 3, any number of cutting plane indicators, each being located at varying distances both above and below the center line, may be disposed on the alignment tool body 200 of the present invention.

Figure 4:
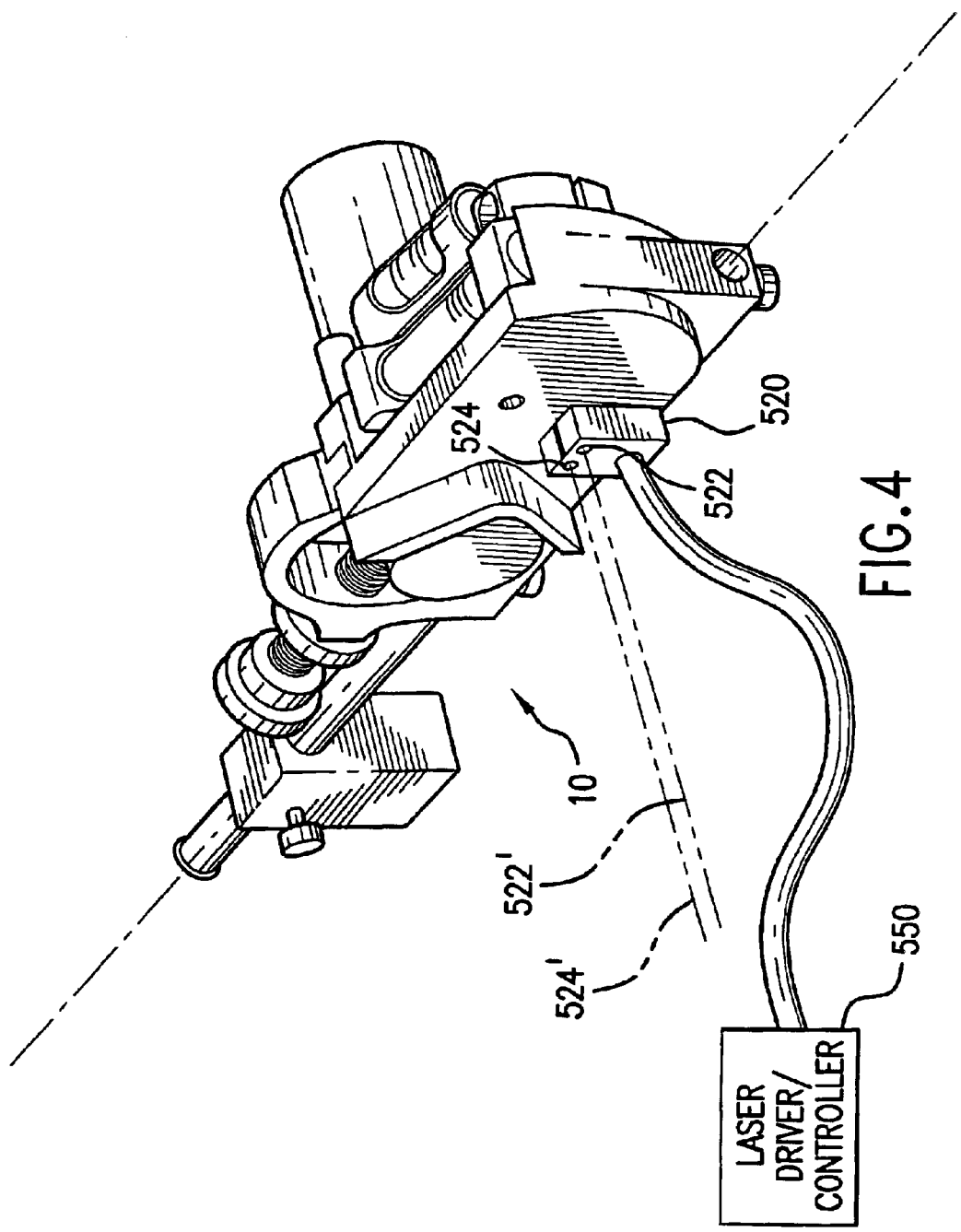
FIG. 4 illustrates an embodiment of the present invention in which the cutting plane indicators are formed by a laser.

In a preferred embodiment, cutting plane indicators 222, 224 are spurs, knife edges, or anvils for contacting the cutting edge or tip of a shaping tool cutter so as to position that cutter on the corresponding cutting plane. However, the cutting plane indicators need not come in direct contact to the cutting edge of the shaping machine cutter. As shown in FIG. 4, another embodiment of the present invention replaces mounting block 220 with a laser assembly 520 and the cutting plane indicators are laser spots 522', 524' emitted from laser beam apertures 522, 524, respectively. Laser assembly 520 is driven and controlled by a remote laser driver/controller 550. The alignment tool user may then use a laser beam spot 522', 524' to locate the cutter of the shaping machine in the desired cutting plane.

Returning to FIGS. 2A, 2B and 2C, there is shown arbor clamp 100 being coupled to alignment tool body 200 by means of two thumbscrews 140. In a preferred embodiment of the present invention arbor clamp 100 includes a generally C-shaped backing brace 102 defining a semi-circular access port in the interior thereof. A clamp screw 110 is threaded into the closed end of backing brace 102 so that the central axis thereof is parallel to the longitudinal center line of the alignment tool 10. At one end of clamp screw 110 is a clamp screw knob 114 for providing a surface by which the clamp screw 110 may be easily gripped. At the opposing end of the clamp screw 110 is a spring loaded clamp screw tip 112, which is used to engage the cylindrical workpiece A. Once clamp screw 110 has engaged workpiece A to the satisfaction of the operator, clamp screw 110 may be secured in position by means of a clamp screw locking nut 120.

On the outer periphery of arbor clamp 100 and parallel to the longitudinal center line of alignment tool 10 there is formed a mounting bore into which counterweight mounting shaft 310 is inserted. Counterweight mounting shaft 310 is retained in the mounting bore by shaft retention screw 130. Counterweight 300 is allowed to slide along counterweight mounting shaft 310 so as to adjust the center of gravity of alignment tool 10. When counterweight 300 has been positioned to the satisfaction of the user, it may be locked in place by counterweight locking screw 320.

Figure 5:
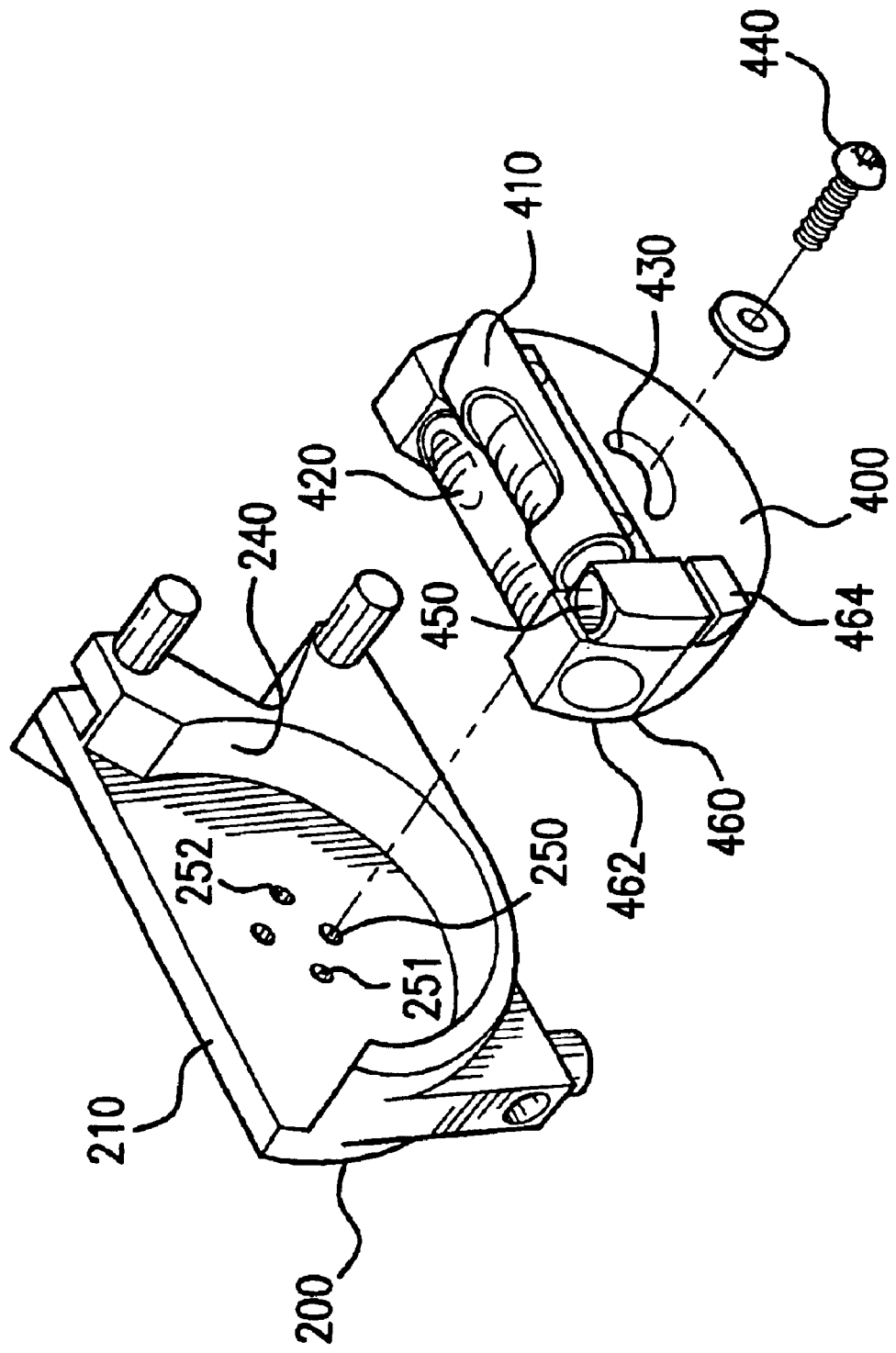
FIG. 5 is an illustration of an exploded view of the cutting axis locator means of the present invention.

At the opposing end of alignment tool 10 to the counterweight 300 and arbor clamp 100 and coupled to alignment tool body 100 is cutting axis locator 400. Cutting axis locator 400 is used to set the longitudinal center line of alignment tool 110 parallel to the cutting axis of the shaping machine. In a preferred embodiment, cutting axis locator 400 is freely rotatable within circular carriage 240 formed on a lateral face of alignment tool body 200 opposing the lateral face of alignment tool body 200 on which cutting plane indicators 222, 224 are installed. As is shown in FIG. 5, cutting axis locator 400 is coupled to alignment tool body 200 by inserting coarse adjustment locking screw 440 through coarse adjustment keyway 430 and threadably engaging coarse adjustment locking screw 440 into one of a plurality of mounting screw holes 250, 251, 252. The selection of mounting screw holes 250, 251, 252 correspondingly selects the degree from which the cutting tool axes and the shaping machine axes are separated in rotation. Once cutting axis locator 400 has been coupled to alignment tool body 200 by means of coarse adjustment locking screw 440 being threadably engaged in one of screw holes 250, 251, 252, finer adjustment in the rotation of cutting axis locator 400 may be made by loosening coarse adjustment locking screw 440 and rotating the cutting axis locator 400 within the limits of semi-circular keyway 430. As will be discussed in paragraphs that follow, even finer adjustment may be made in locating the cutting axis of the shaping machine through fine adjustment screw 450.

Figure 6:
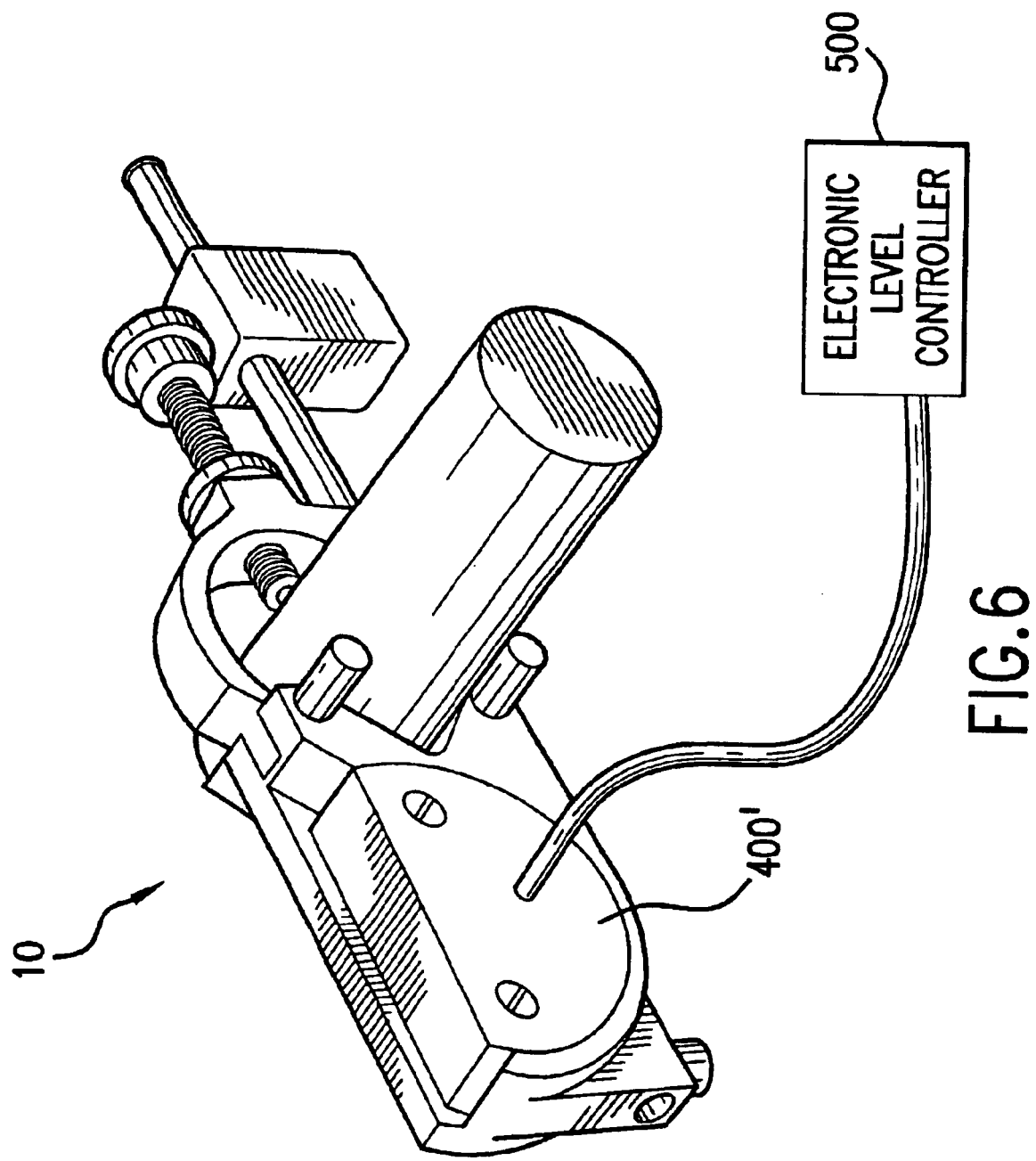
FIG. 6 illustrates an embodiment of the present invention wherein the cutting axis locator means is an electronic level.

In a preferred embodiment, cutting axis locator 400 has installed on an upper periphery thereof a high resolution indicator 420 and a low resolution indicator 410. In a preferred embodiment of the alignment tool of the present invention, the high resolution indicator 420 and low resolution indicator 410 are spirit level vials each having a corresponding sensitivity to orientation in space. Whereas the use of spirit levels provides an easy and compact indication of orientation of alignment tool 10 to the cutting axis of the shaping machine, other indicating means, such as the use of an electronic inclinometer 400' coupled to an electronic controller 500 may be used, as is shown in FIG. 6. Note that in the configuration of FIG. 6, wherein the cutting axis locator 400' is coupled to an electronic level controller 500, the requirement for fine adjustment screw 450 and coarse adjustment locking screw 440 has been eliminated as the sense of rotation is determined by electronic means. The electronic circuitry used to implement the electronic cutting axis locator embodiment of FIG. 6 is well-known in the art and will not be discussed further here.

Referring to FIG. 5, cutting axis locator 400 has formed through the thickness thereof slit 460 which extends almost the entire width of cutting axis locator 400. Both high resolution indicator 420 and low resolution indicator 410 are mounted above slit 460 and fine adjustment screw 450 extends through a bore in upper adjustment mounting block 462 and is threadably engaged in lower adjustment mounting block 464. Alternatively, fine adjustment screw 450 may be threadably engaged in upper adjustment mounting block 462 to apply a force on lower adjustment mounting block 464 through contact thereon by one end of fine adjustment screw 450. In either case, fine adjustment screw 450 is rotated clockwise or counter-clockwise to spread or collapse slit 460. In a preferred embodiment of the present invention, each complete revolution of fine adjustment screw 450 closes or opens slit 460 by approximately 0.006 inches. This allows for precise location of the cutting tool axis.

As previously stated, a preferred embodiment of the present invention utilizes spirit level vials for both the high resolution indicator 420 and low resolution indicator 410. The spirit level vials are graduated with a plurality of division lines. In a preferred embodiment, each division line on the low resolution indicator 410 is equal to 0.002 inches at the cutting plane indicator 222, 224 which is located on the longitudinal center line of alignment tool 10. Each division on the high resolution indicator equates to 0.0002 inches at the same cutting plane indicator. That is to say, that when bubble 422 in the high resolution indicator 420 is off-center therein by one division line, the cutting plane indicator corresponding to the longitudinal center line of the cutting tool 10 is off-center by 0.0002 inches. This clearly illustrates the precise manner in which the cutting plane indicators can be located by the alignment tool of the present invention, the process by which it is used will now be discussed in detail.

Before normal use, the alignment tool of the present invention must first be calibrated to the shaping machine on which it is to be used. Generally speaking, this is a one-time set-up procedure, but may be repeated periodically to insure that the alignment tool maintains a desired accuracy. Once the alignment tool has been calibrated to a given machine, its use to position a given cutter for the shaping machine on which it has been calibrated is a simple and convenient operation.

Figure 7:
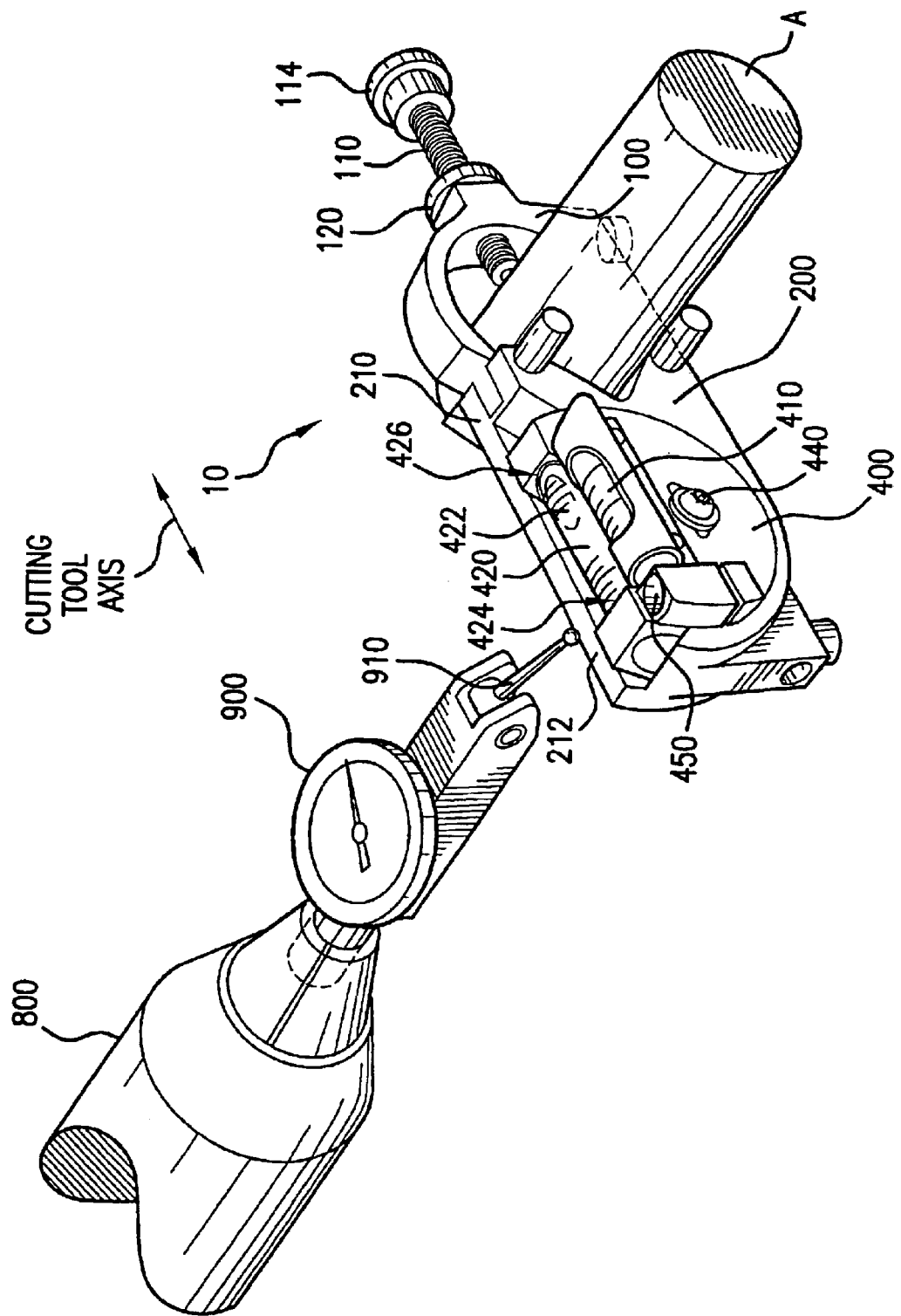
FIG. 7 is an illustration of the cutting axis locator means setting procedure; and, FIG. 8 is an illustration of the alignment tool of the present invention during tool setting procedures.

The set-up tool configuration for the calibration procedure of the alignment tool is illustrated in FIG. 7. As is shown in the Figure, counterweight 300 and counterweight 310 are removed from alignment tool 10 to carry out the calibration procedure. As is further shown, a dial indicator 900 is disposed in the chuck 800 of the shaping machine replacing, temporarily, the cutting tool normally disposed therein. Cutting axis locator 400 is rotated so that coarse adjustment locking screw is threadably engaged in the mounting screw hole 250, 251, 252 which is closest to the angle of the cutting tool axis. The coarse adjustment locking screw 440 is then made finger-tight. Alignment tool 10 is mounted on a precision arbor A and clamp screw knob 114 is tightened until enough drag is created on arbor A by spring loaded tip 112 so that alignment tool 10 will remain in a desired position. Clamp screw locking nut 120 is then tightened to prevent clamp screw 110 from loosening during the procedure.

When alignment tool 10 has been positioned, dial indicator 900 is moved along the cutting tool axis with its probe 910 in contact with indicator surface 210. Alignment tool 10 is rotated on arbor A until dial indicator 900 indicates that indicating surface 210 is parallel with the cutting tool axis to within a desired tolerance. Dial indicator 900 is then located such that its probe 910 is in contact with adjustment position 212. The reading of the dial indicator 900 is then recorded.

With dial indicator 900 at the adjustment position 212, cutting axis locator 400 is rotated until low resolution indicator 410 indicates that it is in position. In a preferred embodiment, where low resolution indicator 410 is a spirit level vial, low resolution indicator 410 is in position when the bubble thereof is centered. Coarse adjustment locking screw 440 is then tightened to secure cutting axis locator 400 in position. Dial indicator 900 is then consulted to insure that alignment tool 10 is still in its original position. If not, the procedure is repeated until low resolution indicator 410 indicates a level condition and dial indicator 900 indicates that alignment tool 10 is in its original position.

With low resolution indicator 410 set, a similar process is carried out for high resolution indicator 420. However, rather than rotating the cutting axis locator 400, adjustments are made via fine adjustment screw 450 until high resolution indicator 420 shows a level condition and dial indicator 900 demonstrates that alignment tool 10 is in its original position. Alignment tool 10 is then calibrated to the cutting tool axis of the shaping machine.

Figure 8:
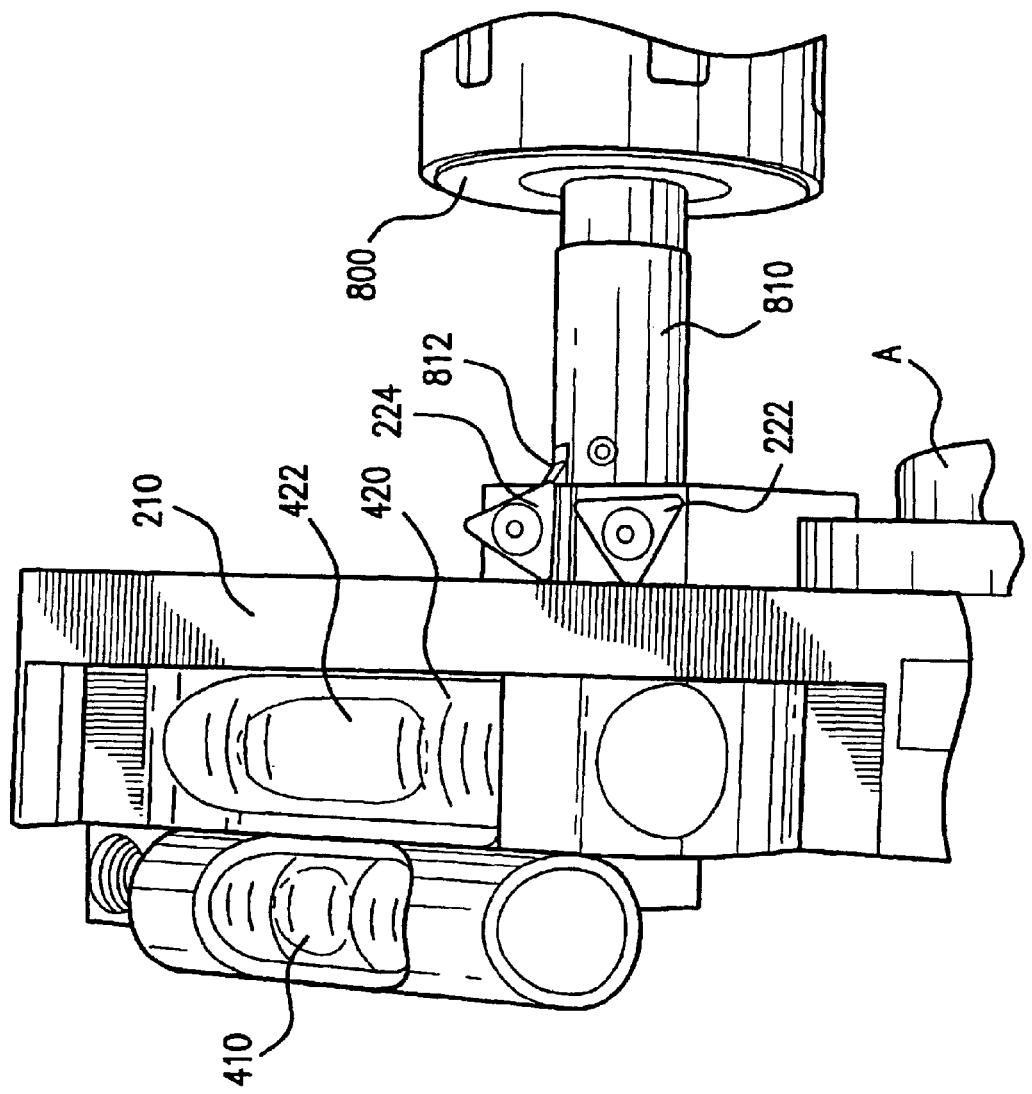

To locate a cutting tool of the shaping machine in a particular cutting plane, the alignment tool 10 is once again positioned on a precision arbor A as shown in FIG. 8. The clamp screw knob 114 is rotated until enough drag has been created to allow rotation by the weight of counterweight 300, but without any side-to-side movement. When clamp screw 10 has been positioned to the satisfaction of the operator, clamp screw locking nut 120 is engaged to prevent clamp screw 110 from backing out during the procedure.

With alignment tool 10 in position, the tip 812 of the cutter 810 is placed against the very smallest portion of the applicable cutting plane indicator 222, 224. In a preferred embodiment, where cutting plane indicators 222, 224 are laser spots from a laser mounted to alignment tool body 200, it is unnecessary for the tip of the cutter to be in actual contact with the cutting plane indicator 222, 224. The laser spot will indicate when the tip of the cutter is in position.

The tip of the cutter is then raised or lowered (often by simply rotating the cutting tool 810 within the chuck 800 of the shaping machine) until bubble 422 in high resolution indicator 420 is centered therein. When high resolution indicator 420 indicates that it is in position, the cutter may be tightly secured in chuck 800.

In a preferred embodiment, when cutting axis locator 400 is an electronic level, both the calibration procedure and the cutting tool placement procedure are simplified in that the electronic level has already been calibrated and may be set by electronic means to indicate a desired inclination of the tool. Thus, during the calibration procedure, when dial indicator 900 shows that alignment tool 10 is parallel to the cutting tool axis, the position of electronic level 400 is placed in the memory of electronic level controller 500 and may be recalled during subsequent cutting tool placement procedures. As such, coarse and fine adjustment means and coarse and fine indicators are unnecessary Although the present invention has been described herein in conjunction with specific embodiments thereof, many alternatives, modifications, and variations will be apparent to those skilled in the art. The present invention is intended to embrace all such alternatives, modifications, and variations that fall within the spirit and broad scope of the appended Claims.

What is claimed is:

1. An alignment tool for positioning a cutting tool at a predetermined cutting location on a workpiece, the workpiece being affixed to a spindle of a shaping machine and being coaxially aligned therewith, the shaping machine being provided with at least orthogonal longitudinal and transverse cutting tool axes and orthogonal longitudinal and transverse shaping machine axes, said cutting tool axes and said shaping machine axes having independent orientation, each with respect to the other, the alignment tool comprising:

an arbor clamp for positioning a longitudinal center line of the alignment tool on an axis of rotation of the spindle;

an alignment tool body including:
      an indicator surface longitudinally parallel to said longitudinal center line of the alignment tool; and
      a plurality of cutting plane indicators coupled to said alignment tool body along said longitudinal center line of the alignment tool, each of said cutting plane indicators indicating a point on a corresponding one of a plurality of cutting planes, said point being located at a predetermined transverse distance from said longitudinal center line of the alignment tool, wherein said point on one of said cutting planes coincides with the predetermined cutting location on the workpiece; and cutting axis locator means coupled to said alignment tool body for aligning said longitudinal center line of the alignment tool to the longitudinal cutting tool axis, said cutting axis locator means including adjustment means for aligning said longitudinal center line of the alignment tool to the longitudinal cutting tool axis of the shaping machine independent of the orientation thereof to the longitudinal shaping machine axis, whereby the cutting tool located at the predetermined location on the workpiece may be translated parallel to the longitudinal cutting tool axis in said one of said cutting planes.

2. The alignment tool as recited in claim 1, wherein each of said cutting plane indicators includes a protruding spur.

3. The alignment tool is recited in claim 1, wherein each of said cutting plane indicators includes a knife edge.

4. The alignment tool as recited in claim 1, wherein each of said cutting plane indicators includes an anvil.

5. The alignment tool as recited in claim 1, wherein one of said cutting plane indicators is located on said longitudinal center line of the alignment tool.

6. The alignment tool as recited in claim 1, wherein said cutting axis locator means includes low resolution indicator means and high resolution indicator means.

7. The alignment tool as recited in claim 6, wherein said low resolution indicator means and said high resolution indicator means include, respectively, a low resolution spirit level vial and a high resolution spirit level vial.

8. The alignment tool as recited in claim 7, wherein said low resolution spirit level vial and said high resolution spirit level vial are graduated by a plurality of division lines.

9. The alignment tool as recited in claim 8, wherein each division line of said low resolution spirit level vial corresponds to a translation of a cutting plane indicator located on said longitudinal center line of the alignment tool of no more than 0.002 inches.

10. The alignment tool as recited in claim 8, wherein each division line of said high resolution spirit level vial corresponds to a translation of a cutting plane indicator located on said longitudinal center line of the alignment tool of no more than 0.0002 inches.

11. The alignment tool as recited in claim 6, wherein said adjustment means of said cutting axis locator means includes coarse and fine adjustment means.

12. The alignment tool as recited in claim 11, wherein said coarse adjustment means rotates said low resolution and high resolution indicator means in a plane parallel to said alignment tool body and about an axis parallel to said axis of rotation of the spindle.

13. The alignment tool as recited in claim 12, wherein said cutting axis locator means includes an upper section and a lower section, said upper section and said lower section immutably coupled at first corresponding edges thereof and held in spaced relationship at second corresponding edges thereof.

14. The alignment tool as recited in claim 13, wherein said low resolution and high resolution indicator means are coupled to said upper section of said cutting axis locator means and said lower section of said cutting axis locator means is coupled to said alignment tool body.

15. The alignment tool as recited in claim 14, wherein said fine adjustment means includes a fine adjustment screw for adjusting an amount of separation of said upper section of said cutting axis locator means with respect to said lower section of said cutting axis locator means at said second corresponding edges.

16. The alignment tool as recited in claim 15, wherein a full rotation of said fine adjustment screw adjusts said amount of separation by no more than 0.006 inches.

17. The alignment tool as recited in claim 1, further including a displaceable counterweight for positioning a longitudinal center of gravity of the alignment tool.

18. The alignment tool as recited in claim 1, wherein said arbor clamp includes:

a V-shaped yoke inwardly disposed in said alignment tool body such that a vertex thereof is located on said longitudinal center line of the alignment tool; and clamping means for positioning said longitudinal center line of the alignment tool on said axis of rotation of the spindle, said clamping means including a backing brace and a clamp screw, said backing brace being coupled to said alignment tool body so that a distal end of said clamp screw is directed towards said vertex of said V-shaped yoke.

19. The alignment tool as recited in claim 18, wherein said distal end of said clamp screw includes a longitudinally displaceable tip, said displaceable tip biased by an elastic member toward said vertex of said V-shaped yoke.

20. An alignment tool for positioning a cutting tool at a predetermined cutting location on a workpiece, the workpiece being affixed to a spindle of a shaping machine and being coaxially aligned therewith, the shaping machine being provided with at least orthogonal longitudinal and transverse cutting tool axes and orthogonal longitudinal and transverse shaping machine axes, said cutting tool axes and said shaping machine axes having independent orientation, each with respect to the other, the alignment tool comprising:

a displaceable counterweight for positioning a longitudinal center of gravity of the alignment tool;

an alignment tool body including:

a V-shaped yoke inwardly disposed therein such that a vertex thereof is located on a longitudinal center line of the alignment tool; and an indicator surface longitudinally parallel to said longitudinal center line of the alignment tool;

a laser assembly coupled to said alignment tool body, said laser assembly having formed thereon a plurality of laser apertures disposed along said longitudinal center line of the alignment tool, each of said laser apertures emitting a laser spot for indicating a point on a corresponding one of a plurality of cutting planes, said point being located a predetermined transverse distance from said longitudinal center line of the alignment tool, wherein said point on one of said cutting planes coincides with the predetermined cutting location on the workpiece;

clamping means for positioning said longitudinal center line of the alignment tool on an axis of rotation of the spindle, said clamping means including a backing brace and a clamp screw, wherein said backing brace is coupled to said alignment tool body so that a distal end of said clamp screw is directed towards said vertex of said V-shaped yoke; and cutting axis locator means coupled to said alignment tool body for aligning said longitudinal center line of the alignment tool to the longitudinal cutting tool axis, said cutting axis locator means including adjustment means for aligning said longitudinal center line of the alignment tool to the longitudinal cutting tool axis of the shaping machine independent of the orientation thereof to the longitudinal shaping machine axis, whereby the cutting tool located at the predetermined location on the workpiece may be translated parallel to the longitudinal cutting tool axis in said one of said cutting planes.

21. An alignment tool for positioning a cutting tool at a predetermined cutting location on a workpiece, the workpiece being affixed to a spindle of a shaping machine and being coaxially aligned therewith, the shaping machine being provided with at least orthogonal longitudinal and transverse cutting tool axes and orthogonal longitudinal and transverse shaping machine axes, said cutting tool axes and said shaping machine axes having independent orientation, each with respect to the other, the alignment tool comprising:

a displaceable counterweight for positioning a longitudinal center of gravity of the alignment tool;

an alignment tool body including:

a V-shaped yoke inwardly disposed therein such that a vertex thereof is located on a longitudinal center line of the alignment tool; and an indicator surface longitudinally parallel to said longitudinal center line of the alignment tool; and a plurality of cutting plane indicators integrally coupled to said alignment tool body along said longitudinal center line of the alignment tool, each of said cutting plane apertures indicating a point on a corresponding one of a plurality of cutting planes, said point being located a predetermined transverse distance from said longitudinal center line of the alignment tool, wherein said point on one of said cutting planes coincides with the predetermined cutting location on the workpiece;

clamping means for positioning said longitudinal center line of the alignment tool on an axis of rotation of the spindle, said clamping means including a backing brace and a clamp screw, wherein said backing brace is coupled to said alignment tool body so that a distal end of said clamp screw is directed towards said vertex of said V-shaped yoke; and an electronic level coupled to said alignment tool body for aligning said longitudinal center line of the alignment tool to the longitudinal cutting tool axis, said electronic level coupled to controller means for storing a user-selected orientation in space of said electronic level, said orientation in space corresponding to said longitudinal center line of the alignment tool being parallel to said longitudinal cutting tool axis.

* * * * *